Figure 1:
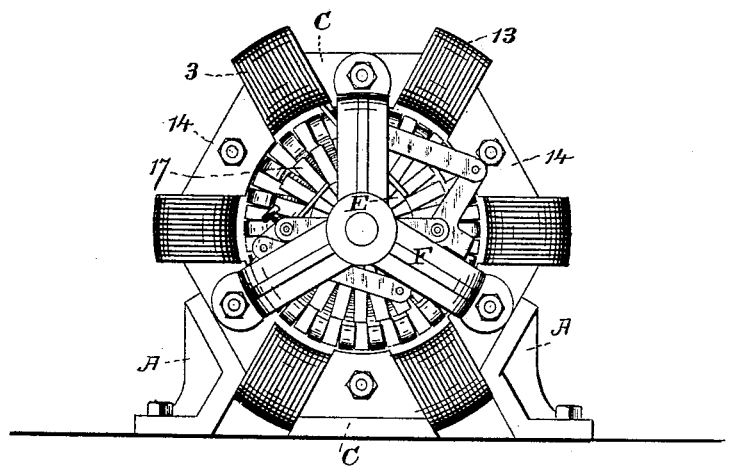

(No Model.) 6 Sheets—Sheet 1.

A. L. RIKER.
ELECTRIC MOTOR AND DYNAMO.

No. 393,266. Patented Nov. 20, 1888.

(No Model.) 6 Sheets—Sheet 2.
A. L. RIKER.
ELECTRIC MOTOR AND DYNAMO.
No. 393,266. Patented Nov. 20, 1888.
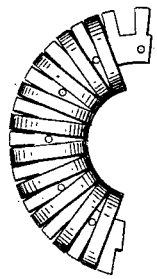
Fig. 3.
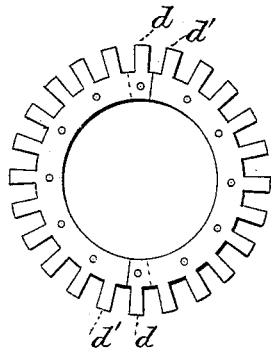
Fig. 4.
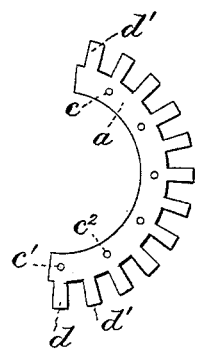
Fig. 5.
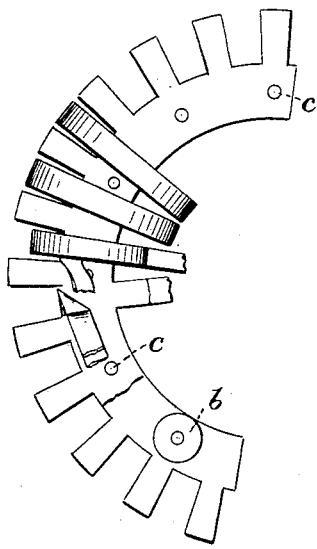
Fig. 6.
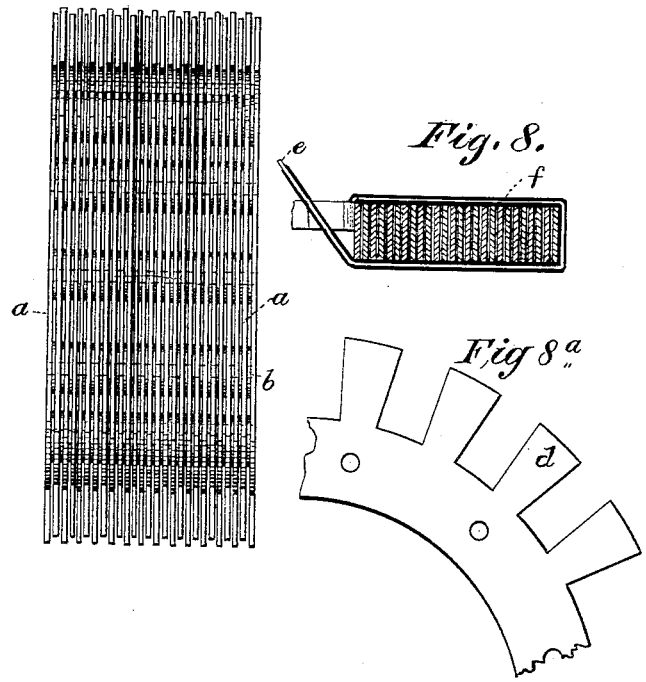
Fig. 7. Fig. 8. Fig. 8ª.
Witnesses:
Philip N. Adams,
C. J. Hedrick.
Inventor:
Andrew L. Riker
by A. Pollok his attorney (No Model.) 6 Sheets—Sheet 3.
A. L. RIKER.
ELECTRIC MOTOR AND DYNAMO.
No. 393,266. Patented Nov. 20, 1888.
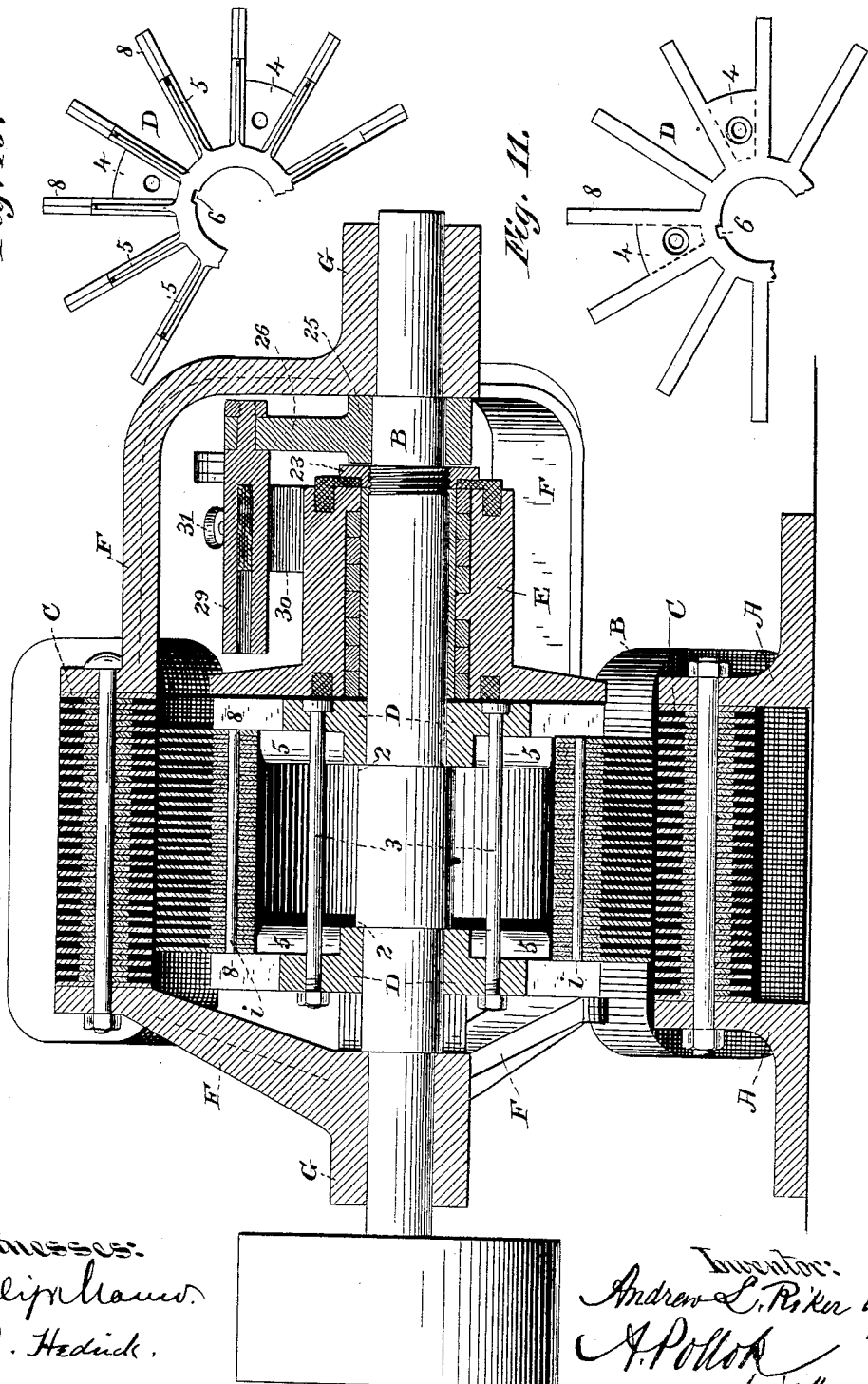

(No Model.) 6 Sheets—Sheet 4.

A. L. RIKER.
ELECTRIC MOTOR AND DYNAMO.

No. 393,266. Patented Nov. 20, 1888.

(No Model.) 6 Sheets—Sheet 5.
A. L. RIKER.
ELECTRIC MOTOR AND DYNAMO.
No. 393,266. Patented Nov. 20, 1888.
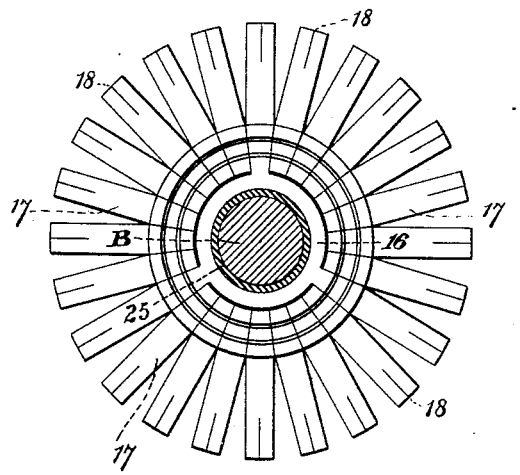
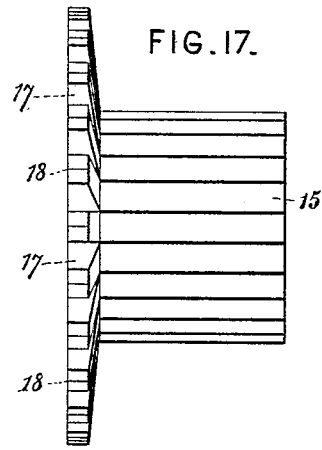
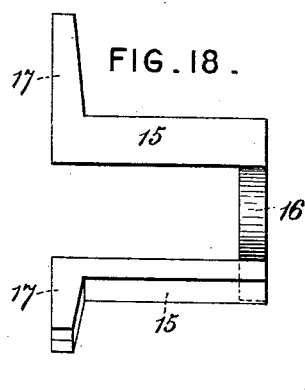
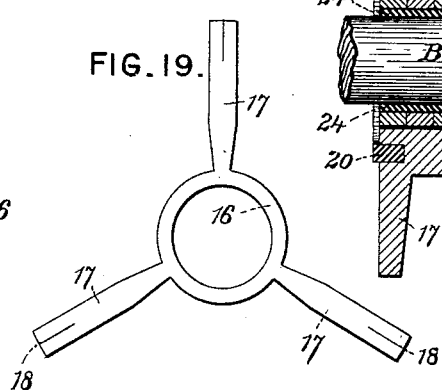
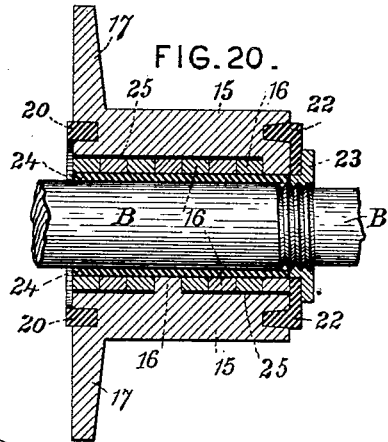

(No Model.) 6 Sheets—Sheet 6.

A. L. RIKER.
ELECTRIC MOTOR AND DYNAMO.

No. 393,266. Patented Nov. 20, 1888.

United States Patent Office.

ANDREW L. RIKER, OF NEW YORK, N. Y.

ELECTRIC MOTOR AND DYNAMO.

SPECIFICATION forming part of Letters Patent No. 393,266, dated November 20, 1888.

Application filed November 1, 1887. Serial No. 253,971. (No model.)

*To all whom it may concern:*

Be it known that I, ANDREW L. RIKER, of New York city, in the county and State of New York, have invented a new and useful Improvement in Electric Motors and Dynamos, which improvement is fully set forth in the following specification.

This invention has reference to the construction of magneto-electric motors or dynamos; and its general object is to increase the efficiency of the machine, while at the same time reducing the weight of metal and cost of construction, and simplifying the construction and assemblage of the several parts.

The armature, which is of the ring form, is built up of a number of successive layers or sheets, as has been heretofore done; but the particular construction of the sections and the mode of assembling them are believed to be new. The presence of numerous joints in the ring is generally regarded as objectionable, so that the form of a continuous ring for each layer is preferred, as giving the best electrical results. On the other hand, it is very difficult to wind an armature of this form. In the present invention the several rings that make up the armature are made in two pieces, so that the winding can be easily accomplished before the halves are joined together. The shape and construction of the sections of the armature are specially adapted to facilitate the winding and joining of the parts together, as will be hereinafter more fully set forth. One feature of the invention is that all the sections of the armature are made from the same die, and their construction is such that they can be put together so that adjacent rings break joints. The field-magnets are built up in the same manner as the armature, being composed of several rings, each ring in two pieces.

The sections of the armature and magnet are stamped out of sheets of soft wrought-iron. For alternate-current machines it is preferred to space the several rings by use of suitable washers, forming spaces for the circulation of air through the magnet to prevent the same becoming unduly heated. Such construction, however, is not broadly new. The commutator is also built up of a number of sections of peculiar shape, as will be hereinafter described. Preferably I employ two brushes, no matter what the number of poles. Consequently, with a four-pole machine the two opposite commutator-plates will be connected electrically, and with a six-pole machine three plates will be cross-connected, and so on. Each brush-spindle has two brushes projecting in opposite directions, and mechanism is employed to reverse the machine by throwing the other ends of both brushes in contact with the commutator. I am aware that such reversing mechanism is not broadly new; but the particular construction hereinafter described has special advantages and utility.

In the accompanying drawings, which form part of this specification, I have illustrated my improvements embodied in a six-pole motor.

Figure 2:
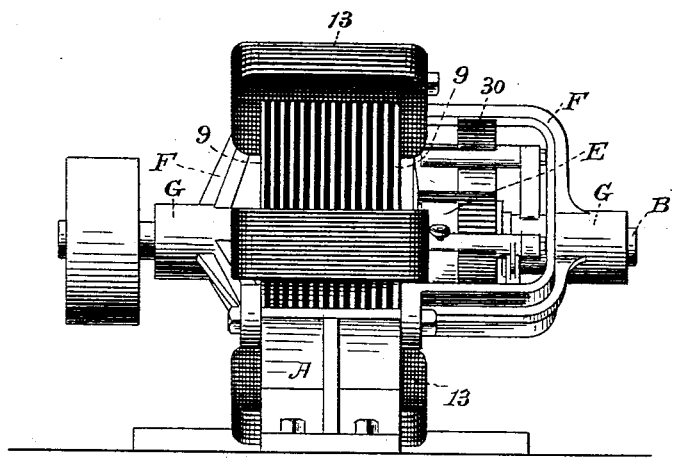
Figure 12:
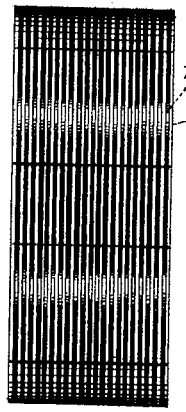
Figure 21:
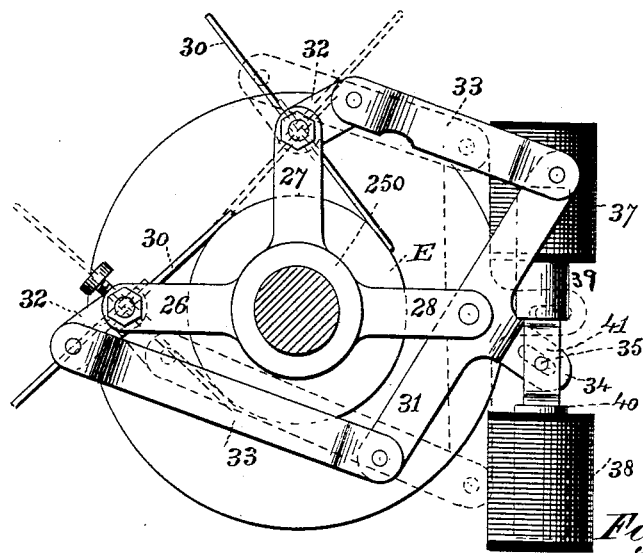
Figure 22:
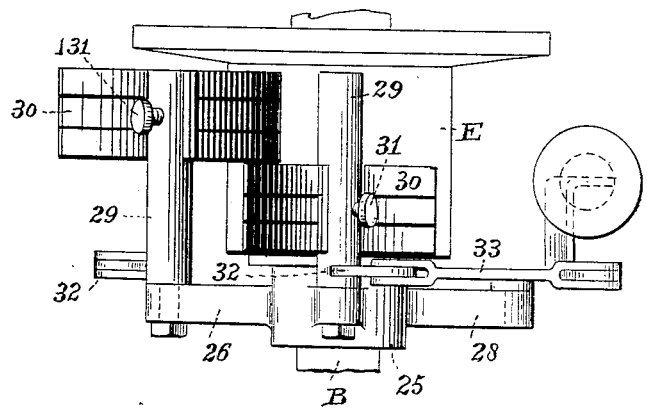

Figure 1 is an end view, and Fig. 2 a side elevation, of such motor. Figs. 3, 4, 5, 6, 7, 8, and $8^a$ are details illustrating the construction of the armature. Fig. 9 is a central longitudinal section of the entire machine; Figs. 10 and 11, details showing opposite sides of the spiders for supporting the armature; Figs. 12, 13, 14, and 15, details of the field-magnet; Figs. 16, 17, 18, 19, and 20, details of the commutator. Fig. 21 is a side view of the brush-holder and reversing mechanism; Fig. 22, a top view thereof, and Fig. 23 a detail of the brushes.

The field-magnets C rest upon supports A, carried by a bed-plate, and to the field-magnets C are bolted the three-armed frames F, which support the journal-bearings G of the armature-shaft B.

The armature, Figs. 3 to $8^a$, is, when completed, in the form of an ordinary Pacinotti ring-armature, and is composed of a number of separate rings, $a$, separated by washers $b$, of paper or other suitable material, the rings being held together by rivets $i$, Fig. 9, passing through rivet-holes $c$. Each ring is composed of two semicircular pieces of the shape shown in Fig. 5—that is to say, the two parts of the ring are of the same shape, and a single die serves for stamping out all the sections of the armature. The rivet-holes $c$, which are stamped out in the same operation, are opposite every alternate tooth $d$, there being no bolt-holes opposite the intermediate teeth, $d'$. It will also be seen by reference to Fig. 5 that at one end of the section $a$ there is a rivet-hole opposite the first tooth, whereas at the other end the hole comes opposite the second tooth. These details are all of importance in securing the result of the easy construction of an armature composed of sections all of the same pattern. The building up of the armature is performed in the following way. Two of the sections $a$ are laid together in the manner shown in Fig. 6, forming a butt-joint unlike ends of the sections $a$, being brought together, as shown. The next ring is formed in the same way; but it is desired to have it break joint with the first by turning the ring the space of one tooth, bringing the joints into position, (shown by the dotted lines, Fig. 4;) but as in this position the rivet-holes would not register it is necessary to turn the entire ring upside down, so that the hole marked $C^2$ in Fig. 5 will coincide with hole C in the first ring. The third ring corresponds precisely in position with the first, the fourth with the second, and so on to the last. Thus by constantly reversing the position of the successive rings with reference to their top and bottom, and also turning the rings alternately forward and back the distance of one tooth, the armature is built up and all the rivet-holes brought into alignment. In winding the armature only the rivets from holes $c'$ $c'$, Fig. 5, are removed, when the two halves of the armature can be taken apart and the winding completed as far as shown in Fig. 3. The portions over the joints must be wound after the parts are riveted together. The spaces between the teeth $d$ are preferably rectangular—that is to say, of the same width throughout, as shown in Fig. $8^a$, whereby the winding with a flat wire is facilitated. Heretofore the spaces between the teeth have been of uniform width, but not when wound with a flat wire, in combination with which the construction has special advantage.

As shown in Fig. 8, the armature is wound with a flat wire, $e$, and a strip of insulating-tape, $f$, a layer of tape coming next to the iron core to insulate the latter from the coils. As shown in the drawings, Figs. 3 and 6, the flat wire forming the coil is a little narrower than the spaces between the teeth $d$, and the successive convolutions of the coil lie one upon the other. In order to make the connections with the commutator-arms, the end of the coil is folded over in the manner shown in Fig. 6, so as to project laterally from the body of the coil. This fold both brings the end of the wire into the space between the two coils and also presents it in such position that it coincides with the plane of the slit 18 in the commutator-arms, Figs. 16 and 19. When the armature has been wound and the two halves joined together, as explained, the armature is mounted on its shaft B, being supported by the two spider-frames D. The construction is best shown in Figs. 9, 10, and 11. The shaft B is turned down on each side of the part surrounded by the armature-ring, leaving shoulders 2, against which the hub portion of the spider-frames D bear, the latter being clamped together by bolts 3, passing through webs 4. The arms of the spider-frames have on their inside projecting ribs 5, the length of which is such that the ribs will just enter the inner periphery of the armature-ring. To secure accuracy in this part of the machine, the frames are mounted on the shaft B and the ribs turned in a lathe to the proper length, the upper edge of each rib being inclined slightly toward the shaft, as shown in Fig. 1, so that the armature is tightened by drawing together the frames D by means of the bolts 3. The frames are provided with grooves or notches 6, which engage a feather on the shaft B, whereby the armature and its supporting-frames are rigidly fixed to the shaft.

The portions 8 of the arms of the spider-frames beyond the ribs 5 are wedge-shaped, being brought to a knife-edge on the inside. These edges enter the space between the armature-coils and bear against the outer faces of the armature, and as there are half as many arms to the spider-frames as their armature-coils a knife-edge enters every other space, slightly crowding the coils together in pairs. The whole construction is such as to secure compactness and rigidity combined with great strength.

Figure 13:
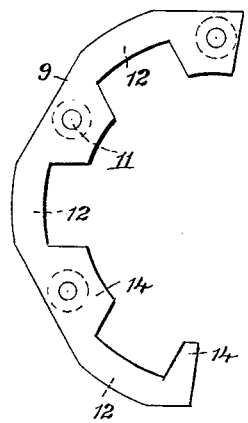
Figure 14:
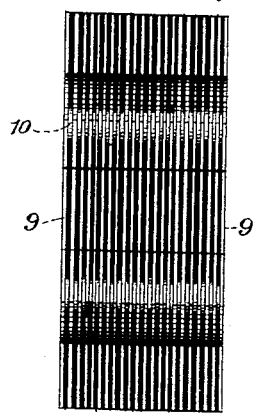

The field-magnets (see Figs. 12 to 15) are ring-shaped, and they are built up like the armature of a number of flat plates or sections, 9, laid one upon the other, and in the case of alternating-current machines are preferably separated by washers 10 to form spaces for the circulation of air to carry away the heat developed by the rapid reversals of current. As in the case of the armature, each ring is in two parts, the shape of which is shown in Fig 13, a single die serving to stamp out all the parts or sections of the field-cores from sheets of soft laminated wrought-iron. One reason that has heretofore prevented the general use of soft wrought-iron for the field-magnets has been the expense and difficulty of producing them, it being necessary either to forge or drop-forge them, both of which are expensive operations. By my invention I am able to produce field-magnets of wrought-iron easily and cheaply. I am aware that it has been proposed heretofore to construct field-magnets of a series of flat plates of cast-iron, and that it has also been proposed to build the magnets up of a series of plates with air-spaces between. I am also aware that it has been proposed to construct them of a series of flat rings of soft iron. The novelty of this part of my invention resides mainly in the peculiar shape of the semicircular sections, whereby magnets can be built up of half-rings all of the same pattern by alternately reversing the sections with reference to their top and bottom.

Figure 15:
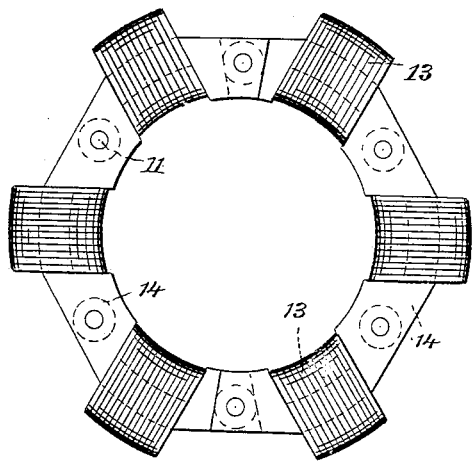

The inner edges of the sections 9 are cut out at intervals to form the cores 12, upon which are wound the coils 13, as shown in Fig. 15, between which are the pole-pieces 14. The inner and outer edges of the parts 12 are curved; but the outer edges of the pole-pieces are straight, the amount of metal being thus reduced to a minimum.

In building up the magnet I proceed precisely as already described with reference to the armature, constantly reversing the several rings with reference to their top and bottom, so that owing to the peculiar shape of the sections adjacent rings break joints. The several rings are secured together by bolts passing through the bolt-holes 11. Therefore in the field-magnets the same advantages as to ease of winding and assembling the parts are secured, as already specified with reference to the armature.

The construction of the commutator E will now be described with reference to Figs. 16 to 20. The commutator consists in the machine shown of twenty-four plates, 15; but as the machine is a six-pole machine, and as only two brushes are used, these plates are connected together in triplets, three plates 15 being carried by each ring or hub 16. Each section of the commutator also has three radial arms, 17, these being at equal distances apart and making altogether twenty-four arms, or one for each coil of the armature. The arms 17 have slits 18 at their outer ends, so that the ends of the armature-coils can be readily inserted therein. The eight commutator-sections are alike in form, with the exception of the relative positions of the ring or hub portions 16, which in each is set a different distance from the ends of the commutator, so that when the sections are assembled the rings 16 will fit close together, forming a continuous hub on the shaft B. The manner of setting up the commutator will be readily understood from the foregoing description. The section with the ring 16 farthest from the radial arms 17 is first put in place. The next section follows, the ring being close to but insulated from the first and the section being turned one twenty-fourth of a revolution, so that the plates 15 and arms 17 follow each other in regular order. When the sections are all in place, a hard-rubber ring, 20, is driven into an annular groove formed in the radial arms. This ring preferably projects slightly beyond the surface of the arms, as shown in Fig. 20, so as to separate the commutator from the spider-frame D. On the other side of the commutator another rubber ring, 22, is driven into a groove, the ring 22 preferably tapering slightly inward, so that the farther it is driven into the groove the tighter the parts are held together. A nut, 23, secures the commutator in place on shaft B.

The commutator is insulated from shaft B by a sleeve, 24, of insulating material—such as rubber—and the rings 16 of each section are insulated from the plates 15 of the other sections by a layer, 25, of insulating material.

Figure 23:
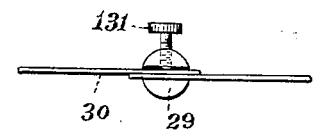

The brushes and their reversing mechanism are illustrated in Figs. 21, 22, and 23. A collar, 250, of hard rubber, loosely surrounds shaft B, and has three arms, 26 27 28. In the ends of the arms 26 27 are pivoted the brush-spindles 29, which carry at their outer ends the flat brushes 30. Each brush-spindle carries two brushes projecting in opposite directions. The ends of spindles 29 are slit and the brushes inserted therein, being held by a set-screw, 131, as shown in Fig. 23. The construction permits adjustment to compensate for wear. To the third arm, 28, is pivoted a tilting lever, 31, the two outer arms of which are connected by links 33 with crank-arms 32 on the brush-spindles 29. By shifting the position of the tilting lever 31 the brush-spindles are rotated sufficiently to reverse the brushes, bringing the parts into the position shown in dotted lines in Fig. 21. The reversal may be done by hand; or it may be accomplished electrically, as by the means shown in Fig. 21. In said figure 37 and 38 are two solenoids, their armatures 39 40 being connected by a strap, 41. To the latter is pivoted arm 34 of the tilting lever 31 by a pin, 35. It is obvious that by exciting the proper magnet the tilting lever can be thrown from one position to the other, as desired.

The construction of the machine being now described, its operation will be readily understood, being the same as that of other well-known machines of the same class and requiring no particular description. It is obvious that modifications could be made in the details of construction without departing from the spirit of the invention and that parts of the invention could be used without the whole.

What I claim is—

1. An armature for motors or dynamos, comprising a series of flat rings having outwardly-projecting teeth composed each of two like parts, adjacent rings breaking joints, and bolts or rivets passing through the overlapping ends of adjacent half-rings, so that by withdrawing said bolts or rivets the armature can be divided diametrically into two halves, substantially as described.

2. An armature for electric motors or dynamos, comprising a series of flat stamped-out rings having teeth and intermediate spaces for the coils and rivet-holes opposite alternate teeth, each ring being composed of two like halves joined at their ends, the rings being reversed alternately with reference to their top and bottom, so that adjacent rings break joints, substantially as described.

3. A ring-armature having notches or spaces for the coils, said spaces being of the uniform width throughout and filled with flat wire approximately the width of said spaces, substantially as described.

4. The combination, with the shaft and ring-armature, of the supporting spider-frames having arms which bear against the outer faces of the armature, and ribs which fit tightly inside the same, the edges of said ribs, upon which the armature rests, being inclined, so that the latter can be tightened by drawing the spider-frames closer together.

5. The combination, with the shaft having shoulders and the ring-armature, of the two spider-frames having ribs projecting inside of and supporting said ring, and projecting arms with knife-edges entering between the armature-coils, and bolts for drawing said frames against said shoulders, substantially as described.

6. A field-magnet comprising a series of flat rings bolted together, each ring having inwardly-projecting parts to form the pole-pieces of the magnet, and being composed of two like parts joined at their ends, the rings being assembled together so as to break joints, substantially as described.

7. The combination, with the armature and shaft, of the commutator mounted on said shaft and comprising the series of sections, each composed of a ring and one or more plates and radial arms, and the holding-rings of hard rubber let into the ends of the commutator, substantially as and for the purpose set forth.

8. The combination, with the commutator, of the reversible brushes, the brush-spindles having crank-arms and carrying each two brushes projecting in opposite directions, the brush-holder carrying said spindles, the tilting lever carried by said holder, and the links connecting said lever and crank-arms, substantially as described.

9. The combination, with the commutator, of the brush-holder, the spindles, the brushes, two carried by each spindle, projecting on opposite sides thereof, the tilting lever pivoted on said holder and connected with said spindles, as specified, the electro-magnets, and the armatures connected with said lever, substantially as described.

In testimony whereof I have signed this specification in the presence of two subscribing witnesses.

ANDREW L. RIKER.

Witnesses:
PHILIP MAURO,
C. J. HEDRICK.